A. J. Williams.

Pea Dropper.

Nº 89,722. Patented May 4, 1869.

Witnesses,
Wm A Morgan
G C Cotton

Inventor,
A. J. Williams
per Munn & Co
Attorneys.

United States Patent Office.

A. J. WILLIAMS, OF BARNESVILLE, GEORGIA, ASSIGNOR TO HIMSELF, AND T. C. WILLIAMS, OF SAME PLACE.

Letters Patent No. 89,722, dated May 4, 1869.

IMPROVEMENT IN PEA-DROPPER.

The Schedule referred to in these Letters Patent and making part of the same.

*To all whom it may concern:*

Be it known that I, A. J. WILLIAMS, of Barnesville, in the county of Pike, and State of Georgia, have invented a new and useful Improvement in Pea-Droppers; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its especial object to furnish an improved machine designed especially for farmers' use, for dropping peas between the hills of corn, to be covered by the plows, in cultivating the said corn, but which shall be equally useful for dropping other kinds of seeds, and which shall, at the same time, be simple in construction, and easily operated, by simply using it in the manner of using a cone; and It consists in the construction and arrangement of the various parts of the machine, as hereinafter more fully described.

A is a small box, made of thin, light wood, or other suitable material.

Figure 1:
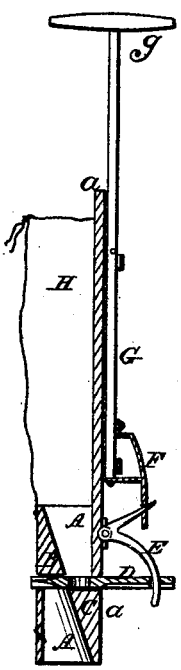
Figure 1 is a longitudinal central section of my improved pea-dropper.

One side, a', of the box A, is extended upward, as shown in fig. 1.

B and C are two blocks, exactly alike in size and shape, but which are placed in reversed positions, and are attached to opposite sides of the box A, as shown in fig. 1.

The inclined sides of the blocks B and C are hollowed out, or concaved, and their broad ends, which are towards each other, each extend about half way across the said box A, as shown in fig. 1.

D is a slide, or valve, which slides back and forth through holes in the opposite sides of the box A, between the ends of the blocks B and C.

The slide D has a hole formed through it, of sufficient size to contain enough peas to form a hill, which hole, when the slide D is drawn back, and the hole through it is covered, upon the lower side, by the upper end of the block C, receives the peas from the upper compartment of the box A, and when the said slide is pushed forward, so that the hole through it is covered by the lower end of the block B, the peas drop through the lower compartment of said box A, to the ground.

Figure 2:
Figure 2 is a detail cross-section of the same.

The slide D is hollowed out upon its lower side, both in front and rear of the hole through it, and upon its upper side only in front of said hole, as shown in figs. 1 and 2.

This construction is designed to prevent husks, shells, and other rubbish from getting into the joints, and choking the action of the slide D.

E is an elbow, or bent lever, which is pivoted at its angle to the outer side of the side a', of the box A.

The end of the lower arm of the elbow-lever E passes through a hole in the end of the slide D, and the end of its upper arm passes through a hole in the arm F, attached to the lower end of the rod G, which slides up and down in keepers, attached to the extended side a', of the box A, the lower keeper being between the points of attachment of the arm F, so that the said arm may act as a stop, to limit the movement of the said rod G.

To the upper end of the rod G is attached a crosshead, or handle, g', by means of which the machine is carried and operated.

H is a bag, or pouch, the lower edge of which is attached to the upper ends of the short sides of the box A, and the side edges of which are attached to the side edges of the extended side a'.

The upper end of the bag, or pouch H, may be closed with a draw-string.

The machine may be kept from working by passing a pin through a hole in the rod G, above the upper keeper.

For some kinds of soils, the lower end of the box may be provided with a hopper-shaped metallic mouthpiece, or with a metallic downward extension of the side a'.

If desired, the operating parts of the machine may be covered with caps, to protect them, but this is not essential.

In using the machine, as it is lifted from the ground, the slight upward movement of the rod G draws back the slide D, into the position shown in figs. 1 and 2, allowing the hole in said slide to be filled from the upper compartment of the box A, and, as the machine is again set upon the ground, the natural downward pressure upon the rod G forces the slide D forward, dropping the peas upon the ground.

Having thus described my invention,

I claim as new, and desire to secure by Letters Patent—

The arrangement of the handle G, arm F, elbow-lever E, and slide D, with the box A and blocks B C, operating as herein described, for the purpose specified.

A. J. WILLIAMS.

Witnesses:
J. M. MORRIS,
O. S. HIGGINS.